United States Patent [19]

Yoshida

[11] Patent Number: 4,603,410
[45] Date of Patent: Jul. 29, 1986

[54] ERROR SIGNAL GENERATING DEVICE FOR USE IN AN APPARATUS FOR OPTICALLY READING INFORMATION WITH A RESISTANCE NETWORK CONNECTED TO PHOTO DETECTOR ELEMENTS

[75] Inventor: Masayuki Yoshida, Tokorozawa, Japan

[73] Assignee: Pioneer Electronic Corporation, Tokyo, Japan

[21] Appl. No.: 501,101

[22] Filed: Jun. 6, 1983

[30] Foreign Application Priority Data

Jun. 7, 1982 [JP] Japan .................. 57-097164

[51] Int. Cl.$^4$ .................. G11B 7/095; G11B 7/13
[52] U.S. Cl. .................. 369/45; 369/46; 250/202
[58] Field of Search .................. 358/342; 369/45, 44, 369/46; 250/201 DF, 202; 338/48

[56] References Cited

U.S. PATENT DOCUMENTS 3,198,949 8/1965 Holdo .................. 250/202
4,467,462 8/1984 Shibata .................. 369/46 X Primary Examiner—Raymond F. Cardillo
Assistant Examiner—Robert A. Weinhardt
Attorney, Agent, or Firm—Fleit, Jacobson, Cohn & Price

[57] ABSTRACT

A servo device for use with a system for reading out recorded information having at least two pickup elements which produce pickup signals comprising a resistance network including at least a resistance through which at least two of the pickup signals flow, and an error signal producing device for producing a tracking error signal and a focusing error signal in accordance with a voltage level developed at a terminal of the resistance, whereby eliminating the use of a plurality of amplifying circuits and adder circuits which are respectively connected to each of pickup elements, and enabling the production of more accurate error signals and reduction of the cost of the servo device.

3 Claims, 2 Drawing Figures

ERROR SIGNAL GENERATING DEVICE FOR USE IN AN APPARATUS FOR OPTICALLY READING INFORMATION WITH A RESISTANCE NETWORK CONNECTED TO PHOTO DETECTOR ELEMENTS

BACKGROUND OF THE INVENTION

1. Field of the Invention

The present invention relates to a servo device, and more specifically to a servo device for use with an optical system for reading out recorded information such as an optical video disc player and a digital audio disc player.

2. Description of Background Information

In an optical system for reading out recorded information, for example, a read out energy beam such as a laser beam is applied, via an object lens, as a light spot along a recording track formed on a recording medium. In applying the light spot of the laser beam, it is especially important to control the light spot precisely in position. Therefore, it is necessary to provide a servo device which produces a tracking error signal and also focus error signal which are to be applied to a driving means of a tracking mirror and to a driving means of the object lens. On the other hand, in order to reproduce the recorded information by means of the light spot of the read out laser beam applied on the recording medium, the read out system is provided with a photo detector operable as a photoelectric transducer, which detects a reflection of the laser beam from the recording surface of the recording medium. Further, it is necessary to use a four segment type photo detector which has, for example, four independent cells of photo diodes in a single casing, and therefore, has four independent output signals. In that case, the servo device is applied with four output signals from the photo detector to produce the tracking error signal and the focus error signal. However, in the case of the conventional arrangement of the servo device, there was a tendency that the operation of the device becomes inaccurate since the output signals from each segment of the photo detector are treated at first independently by a plurality of circuits for processing an input signal which are respectively connected to each cell of the photo detector. Furthermore, there was a drawback that the cost of the servo device tends to be rather significant because of the use of numbers of circuit elements respectively connected to each segment of the photo detector.

SUMMARY OF THE INVENTION

An object of the present invention is therefore to provide a servo device for use with a system for reading out recorded information with a photo detector having a plurality of segments, which can produce more accurate tracking error signal and focus error signal.

Another object of the present invention is to provide a servo device which can be built at a lower cost relative to the conventional arrangement.

According to the present invention, a servo device for use with an optical system for reading out recorded information having at least two pickup elements which produce pickup signals comprises a resistance means including at least a resistance through which at least two of the pickup signals flow, and an error signal producing means for producing at least one error signal in accordance with a voltage level developed at a terminal of the resistance.

According to another aspect of the invention, the system for reading out recorded information has first to fourth pickup elements each having a first terminal and a second terminal, and the resistance means comprises first to fourth resistances of which a terminal of the first resistance is connected to the first terminals of the first and the third pickup elements, a terminal of the second resistance is connected to the first terminals of the second and the fourth pickup elements, a terminal of the third resistance is connected to the second terminals of the first and the second pickup elements, and a terminal of the fourth resistance is connected to the second terminals of the third and the fourth pickup elements, while terminals of the first and the second resistances other than the terminals connected to the pickup elements are commonly connected to a fifth resistance which is connected to a first predetermined potential, and terminals of the third and the fourth resistances other than the terminals connected to the pickup elements are commonly connected to a sixth resistance which is connected to a second predetermined potential.

According to further aspect of the invention, the error signal producing means comprises a tracking error signal producing means which includes a first differential amplifier which receives a potential at the first terminals of the first and third pickup elements, and a potential at a junction of the first terminals of the second and fourth pickup elements; first and second sample and hold circuits connected to the first differential amplifier and respectively supplied with a first and a second sampling pulses, and a second differential amplifier connected to the sample and hold circuits for producing a differential signal as a tracking error signal, and a focusing error signal producing means including a third differential amplifier which receives a potential at a junction of the second terminals of the first and second pickup elements and a potential at a junction of the second terminals of the third and fourth pickup elements and produces a differential signal as a focusing error signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein.

DETAILED DESCRIPTION OF A PREFERRED EMBODIMENT

Figure 1:
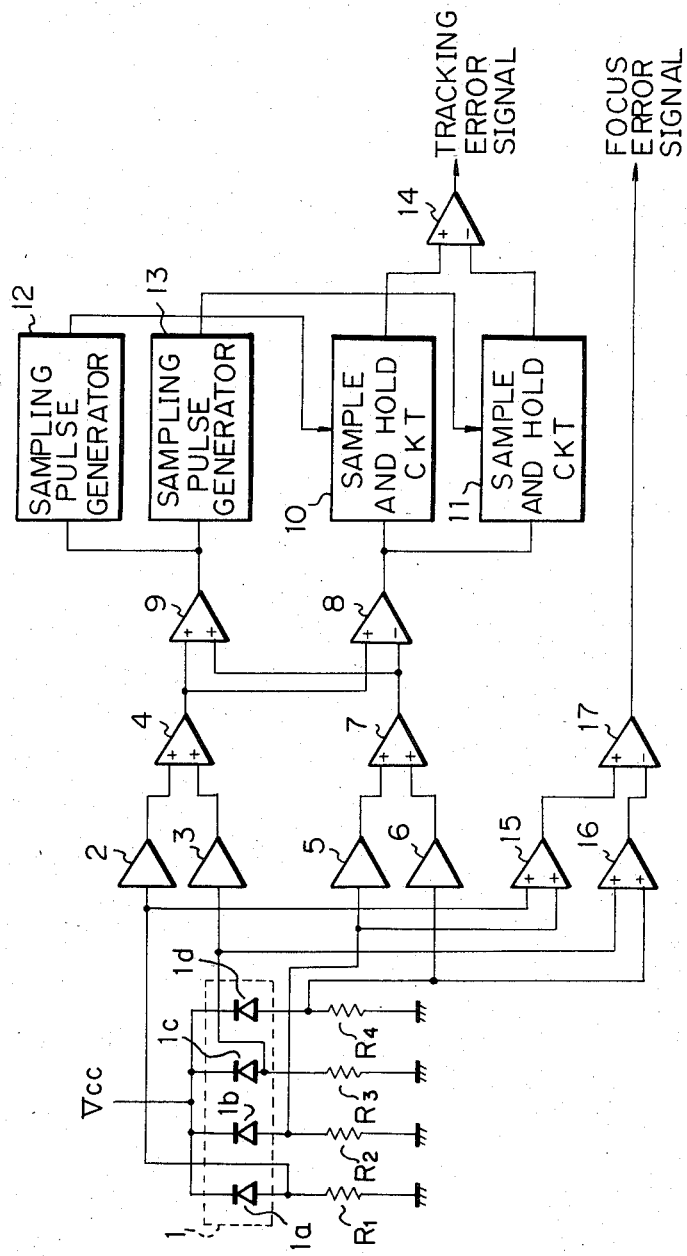
FIG. 1 is a block diagram of a conventional servo device for use with an optical system for reading out recorded information.

Before entering into an explanation of the servo device according to the present invention, reference is first made to FIG. 1 in which the block diagram of the conventional servo device is illustrated. As shown, a pickup means includes a four segment photo detector which, for example, detects a reflection of a light spot of a laser beam which is applied on series of pits forming a recording track on a recording disc. The photo detector 1 has four independent photo diodes 1a, 1b, 1c and 1d which are arranged on the sides of a couple of split lines crossing at a right angle to each other. The photo diodes 1a through 1d are arranged in a manner that two of the photo diodes 1a and 1c, or 1b and 1d are disposed diagonally and the photo diodes 1a and 1b, 1c and 1d (1b and 1c, 1d and 1a) are disposed side by side. The cathodes of the diodes 1a through 1d are connected together and a power voltage Vcc is supplied thereto. The anodes of the diodes 1a through 1d are grounded via resistors $R_1$, $R_2$, $R_3$, and $R_4$ respectively. With this arrangement, output currents from the diodes 1a through 1d are respectively supplied to the resistors $R_1$ through $R_4$ and converted to output voltages at respective junctions between the anodes of the diodes 1a through 1d and the resistors $R_1$ through $R_4$. In order to amplify the output voltages of the photo diodes 1a through 1d, four amplifiers 2, 3, 5, and 6 are provided. Output signals of the amplifier 2 and 3 which receive the output voltage of the diodes 1a and 1c arranged diagonally are then applied to an adder circuit 4. Also, output signals of the amplifier 5 and 6 which receive the output voltage of the diodes 1b and 1d also arranged diagonally are applied to an adder circuit 7. Output signals of the adder circuits 4 and 7 are then applied to an adder circuit 9. Further the output signals of the adder circuits 4 and 7 are respectively applied to a non inverting input terminal and to an inverting input terminal of a differential amplifier 8.

An output signal of the differential amplifier which represents the difference between the output signals of the adder circuits 4 and 7 is then applied to a couple of sample and hold circuits 10 and 11. The sample and hold circuits 10 and 11 receive respectively sampling pulses from sampling pulse generators 12 and 13 connected to an output terminal of the adder circuit 9. More specifically, the sampling pulse generator 12 produces the sampling pulse at a timing of the zero cross point of a leading edge of an RF signal from the adder circuit 9 which is a reproduced information signal obtained from the sum of the output signals of each elements of the photo detector 1. Similarly, the sampling pulse generator 13 produces the sampling pulse at a timing of the zero cross point of a trailing edge of the RF signal from the adder circuit 9. The output signals of the sample and hold circuits 10 and 11 are then applied to a differential amplifier 14 in which a differential signal of the signals from the sample and hold circuits 10 and 11 is produced. The differential signal from the differential amplifier 14 represents the phase difference between the reproduced RF signal and a differential signal from the differential amplifier 8, which corresponds to the magnitude and the direction of the difference between the position of the light spot of the laser beam and the position of the recording track on the recording medium. Therefore, the differential signal from the differential amplifier 14 is applied to a drive means of a tracking mirror (not shown) and used as the tracking error signal.

On the other hand, the focus servo signal is produced by the circuit elements described hereinafter. The output signals of the adjacent two photo diodes 1a and 1c are applied to an adder circuit 15. Also, the output signals of the adjacent two photo diodes 1b and 1d are applied to an adder circuit 16. Output signals of the adder circuits 15 and 16 are then applied to a differential amplifier in which a differential signal of the input signals is produced. The thus produced differential signal from the differential amplifier 17 represents the magnitude and the direction of the difference between the focal point of the light spot of the read out laser beam and the surface of the recording track on the recording disc. Therefore, the output signal of the differential amplifier 17 is then applied to a driving means (not shown) of the object lens as a focus error signal.

As mentioned before, in the case of the conventional servo device described hereinabove, there are disadvantages such that the adjustments of the gain of the amplifiers 2 through 6 are rather critical and therefore it is pretty difficult to effect an accurate signal processing. This is due to the use of a plurality of circuit elements such as amplifiers, adder circuits, and differential amplifiers, which also results in the increase of the cost of the servo device.

Figure 2:
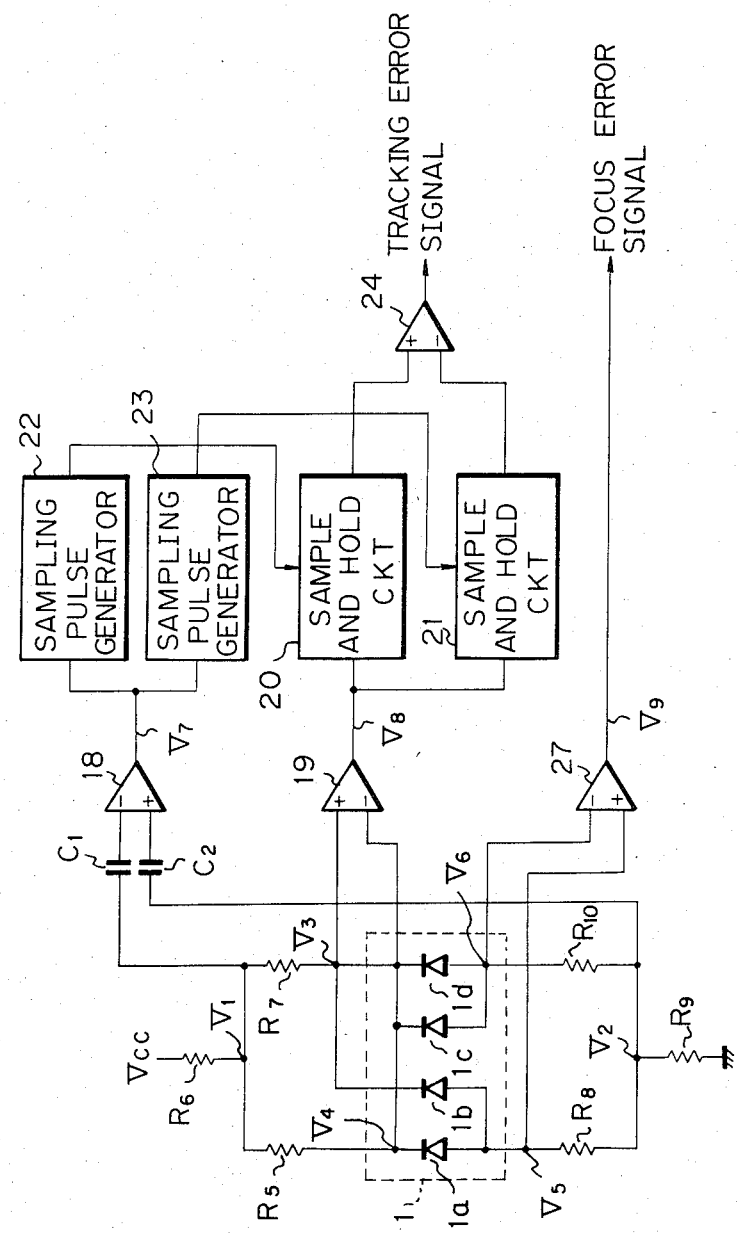
FIG. 2 is a block diagram of a servo device according to the present invention.

The present invention is therefore aimed to provide a servo device which can produce very accurate error signals by using less circuit elements. An embodiment of the servo device according to the present invention will be explained with reference to FIG. 2 hereinafter.

As shown, four photo diodes 1a, 1b, 1c, and 1d are provided as the elements of a photo detector 1 of pickup means of the read out system. Similar to the conventional arrangement, the photo diodes 1a and 1c, 1b and 1d are respectively diagonally disposed in a casing of the photo detector. Also, the photo diodes 1a and 1b, 1c and 1d are disposed side by side.

The cathodes of the photo diodes 1a and 1c which are arranged diagonally are connected commonly to a resistor $R_5$. Also, the cathodes of the photo diodes 1b and 1d which are also arranged diagonally are connected commonly to a resistor $R_7$. The resistors $R_5$ and $R_7$ have the same resistance value ($R_5 = R_7$) and are connected to a resistor $R_6$ which is connected to a power supply Vcc. On the other hand, the anodes of the adjacent two photo diodes 1a and 1b are connected with each other and connected to a resistor $R_8$. Also, the anodes of the adjacent two photo diodes 1c and 1d are connected with each other and connected to a resistor $R_{10}$. The resistors $R_8$ and $R_{10}$ have the same resistance value ($R_8 = R_{10}$) and are commonly connected to a resistor $R_9$ which is grounded.

A voltage $V_1$ which develops at the junction between the resistor $R_6$ and resistors $R_5$ and $R_7$ is applied to an inverting input terminal of a differential amplifier 18 via a capacitor $C_1$ for stopping a dc component. Similarly, a voltage $V_2$ which develops at a junction between the resistor $R_9$ and the resistors $R_8$ and $R_{10}$ is applied to a non-inverting input terminal of the differential amplifier 18 via a capacitor $C_2$ for stopping a dc component.

A voltage $V_4$ which develops at the commonly connected cathodes of the photo diodes 1a and 1c at which the resistor $R_5$ is connected, is applied to an inverting input terminal of a differential amplifier 19. Similarly, a voltage $V_3$ which develops at the commonly connected cathodes of the photo diodes 1b and 1d at which the resistor $R_7$ is connected, is applied to a non-inverting input terminal of the differential amplifier 19.

An output signal from the differential amplifier 18 is then applied to a couple of sampling pulse generators 22 and 23. The sampling pulse generator 22 produces sampling pulses at a timing of zero cross points of leading edges of the RF input signal from the differential amplifier 18, and the sampling pulse generator 23 produces sampling pulses at a timing of zero cross points of trailing edges of the RF input signal from the differential amplifier 18.

An output signal of the differential amplifier 19 is then applied to a couple of sample and hold circuits 20 and 21 which respectively receive the sampling pulses from the sampling pulse generators 22 and 23. Output signals from the sample and hold circuits 20 and 21 are then applied to a differential amplifier 24 respectively at a non-inverting input terminal and at an inverting input terminal thereof. An output signal of the differential amplifier 24 will be applied to a driving means (not shown) of a tracking mirror as a tracking error signal.

On the other hand, a voltage $V_5$ which develops at the junction between the resistor $R_8$ and the anodes of the photo diodes $1a$ and $1b$ is applied to a non-inverting input terminal of a differential amplifier 27. Similarly, a voltage $V_6$ which develops at the junction between the resistor $R_{10}$ and the anodes of the photo diodes $1c$ and $1d$ is applied to an inverting input terminal of the differential amplifier 27. An output signal of the differential amplifier 27 will be then applied to a driving means (not shown) of the focus lens of the read out system as a focusing error signal.

The operation of the servo device which has been described will be further explained mathematically hereinafter.

If the output currents of the photo diodes $1a$ through $1d$ are expressed as $I_1$, $I_2$, $I_3$, and $I_4$, then a voltage which develops across the terminals of the resistor $R_6$ is expressed as $(I_1+I_2+I_3+I_4)R_6$. Similarly, a voltage which develops across the terminals of the resistor $R_9$ is expressed as $(I_1+I_2+I_3+I_4)R_9$. Accordingly, the voltages $V_1$ and $V_2$ will be expressed by the following equation:

$$V_1 = Vcc - (I_1+I_2+I_3+I_4)R_6 \quad (1)$$

$$V_2 = (I_1+I_2+I_3+I_4)R_9 \quad (2)$$

in which Vcc is the voltage level of the power supply.

If we assume that the gain of the differential amplifier 18 is $A_1$, then the output signal $V_7$ of the differential amplifier 18 which receives the voltages $V_1$ and $V_2$ after cutting the dc components off, will be expressed as follows.

$$V_7 = A_1(I_1+I_2+I_3+I_4)(R_6+R_9) \quad (3)$$

As it will be apparent from the equation (3), the differential amplifier 18 produces a reproduced information signal obtained from the sum of the output signals of each cell, i.e. each of photo diodes $1a$ through $1d$, of the photo detector 1.

Similarly, each of the voltages $V_3$ through $V_6$ will be expressed as follows.

$$V_3 = Vcc - \{(I_1+I_2+I_3+I_4)R_6 + (I_2+I_4)R_7\} \quad (4)$$

$$V_4 = Vcc - \{(I_1+I_2+I_3+I_4)R_6 + (I_1+I_3)R_5\} \quad (5)$$

$$V_5 = (I_1+I_2+I_3+I_4)R_9 + (I_1+I_2)R_8 \quad (6)$$

$$V_6 = (I_1+I_2+I_3+I_4)R_9 + (I_3+I_4)R_{10} \quad (7)$$

Accordingly, the output signal $V_8$ of the differential amplifier 19 which is applied with the voltage signals $V_3$ and $V_4$, and the output signal $V_9$ of the differential amplifier 27 which is applied with the voltage signals $V_5$ and $V_6$, will be expressed as follows:

$$V_8 = A_2(V_3 - V_4) = A_2\{(I_1+I_3)R_5 - (I_2+I_4)R_7\} \quad (8)$$
$$= A_2\{(I_1+I_3) - (I_2+I_4)\}R_5$$
$$V_9 = A_3(V_5 - V_6) = A_3\{(I_1+I_2)R_8 - (I_3+I_4)R_{10}\} \quad (9)$$
$$= A_3\{(I_1+I_2) - (I_3+I_4)\}R_8$$

in which $A_2$ and $A_3$ are respectively gains of the differential amplifiers 19 and 27.

As it is apparent from the equation (8), a differential signal of the summation of the output signals of photo diodes $1a$ and $1c$ which are arranged diagonally, and in turn a differential signal of the summation of the output signals of photo diodes $1b$ and $1d$, is produced by the differential amplifier 19. In addition, one of the two types of the differentials signal from the differential amplifier 19 will be respectively selected in the sample and hold circuits 20 and 21 in accordance with the timing of sampling. Also, as it is apparent from the equation (9), a differential signal of two summations of the output signals of the photo diodes $1a$ and $1b$, $1c$ and $1d$ which are arranged adjacent to each other, is produced by the differential amplifier 27.

It will be appreciated from the foregoing that the servo device according to the present invention is characterized in that the process for adding the output signals of the photo diodes of the four segment type photo detector is performed only by means of the network of resistors. Therefore, the tracking error signal and the focusing error signal are produced, more accurately than the conventional arrangement. Furthermore, the device can be produced at a lower cost because of the reduced number of the circuit elements.

It should be understood that the foregoing description is for illustrative purpose only, and is not intended to limit the scope of the invention. Rather, there are numerous equivalents to the preferred embodiments, and such are intended to be covered by the appended claims.

What is claimed is

1. An error signal generating device for use in an apparatus for optically reading information having a light source for irradiating an optical recording medium and first to fourth photo detector elements for receiving a light beam emitted from said light source and modulated by said recording medium, each of said photo detector elements having first and second terminals, said error signal generating device comprising:
   resistance network means supplied with a drive current from said photo detector elements, said resistance network means including at least four resistance elements with first and second terminals,
   said first terminals of said first resistance element and said first and third photo detector elements being connected together to form a first junction,
   said first terminals of said second resistance element and said second and fourth photo detector elements being connected together to form a second junction, said second terminals of said third resistance element and said first and second photo detector elements being connected together to form a third junction, said second terminals of said fourth resistance element and said third and fourth photo detector elements being connected together to form a fourth junction;

means for generating a first difference signal between a signal developed at said first junction and a signal developed at said second junction;

means for generating a second difference signal between a signal developed at said third junction and a signal developed at said fourth junction; and means for deriving at least one error signal using at least one of said first and second difference signals.

2. An error signal generating device as set forth in claim 1, wherein said resistance network means further includes fifth and sixth resistance elements with first and second terminals, said second terminals of said fifth resistance element and said first and second resistance elements being connected together to form a fifth junction, said first terminals of said sixth resistance element and said third and fourth resistor elements being connected together to form a sixth junction, said drive current being supplied across said terminals of said fifth and sixth resistance elements, and wherein the device further comprises means for generating a third difference signal between a signal developed at said fifth junction and a signal developed at said sixth junction as a signal indicative of a sum of output currents of said first to fourth photo detector elements.

3. A servo device as set forth in claim 2, wherein said means for deriving error signal comprises a tracking error signal producing means which includes, first and second sampling pulse generator means connected to said means for generating a third difference signal for respectively generating first and second sampling pulses; first and second sample and hold circuits connected to said means for generating a first difference signal and respectively supplied with said first and second sampling pulses; and a differential amplifier connected to said first and second sample and hold circuits for producing a differential signal as a tracking error signal, and a focusing error signal producing means for providing said second difference signal as a focusing error signal.

* * * * *